United States Patent [19]
Herzog

[11] 3,777,990
[45] Dec. 11, 1973

[54] VALVED NOZZLE FOR AN INJECTION MOLDING MACHINE

[76] Inventor: Kurt Herzog, Wilketstrasse 186, Degersheim, Switzerland

[22] Filed: Apr. 14, 1972

[21] Appl. No.: 244,150

[30] Foreign Application Priority Data
Apr. 20, 1971 Switzerland.......................... 5743/71
Aug. 9, 1971 Switzerland........................ 11698/71

[52] U.S. Cl. .............................................. 239/571
[51] Int. Cl. .............................................. B05b 1/30
[58] Field of Search ................................... 239/571

[56] References Cited
UNITED STATES PATENTS
2,812,979  11/1957  Ziesche et al.................... 239/571 X
2,951,647  9/1960   Dreisin............................ 239/571 X Primary Examiner—Lloyd L. King
Attorney—Kurt Kelman et al.

[57] ABSTRACT

The restricted discharge orifice in a nozzle for an injection molding machine is normally held closed by a valve member in the nozzle bore which engages a valve seat in the bore contiguously adjacent the orifice. The valve member is biased toward the closed position by a helical compression spring in the nozzle bore. The spring is a metal strip of rectangular cross section whose narrow edges bound the steeply helical gap separating the spring turns. The valve is opened by the pressure of the molten plastic when used on a screw-type injection machine, or by engagement of the mold with an abutment projecting from the valve member outward of the nozzle orifice in the closed position of the valve, when the nozzle is used on a plunger-type molding machine.

6 Claims, 3 Drawing Figures

VALVED NOZZLE FOR AN INJECTION MOLDING MACHINE

This invention relates to injection molding machines for thermoplastic synthetic resin compositions, and particularly to a nozzle for use on the heating cylinder of such a machine. More specifically, the invention is concerned with an injection nozzle equipped with a valve.

The bore of conventional valved injection nozzles communicates with the outside not only through the discharge orifice proper, but also through openings associated with movable slides or valve needles. Entry of the plastic material into these openings causes damage to the closing elements and to the heaters normally provided on the discharge nozzle.

It is a primary object of the invention to provide a valved nozzle for an injection molding machine in which accidental leakage of the material to be molded from the bore of the nozzle is safely prevented.

According to this invention, all elements of the valve mechanism are enclosed in the bore of the nozzle and exposed to the pressure of the fluid plastic in the heating cylinder of the machine so that the orifice of the nozzle provides the sole path of material outward of the main portion of the nozzle bore when the valve is in its orifice opening position during discharge of the plastic from the machine into a mold.

Particular advantages are achieved by biasing the valve toward the orifice-sealing position by means of a helical compression spring in the nozzle bore, the spring being an elongated piece of metal or other suitable material having the cross sectional shape of an elongated rectangle. The turns of the spring are separated by a helical gap bounded by the narrow faces of consecutive turns of the spring, the wide faces of the spring turns being parallel to the axis of the bore.

Other features, additional objectives, and many of the attendant advantages of this invention will readily become apparent from the following detailed description of preferred embodiments when considered in connection with the appended drawing in which.

Figure 1:
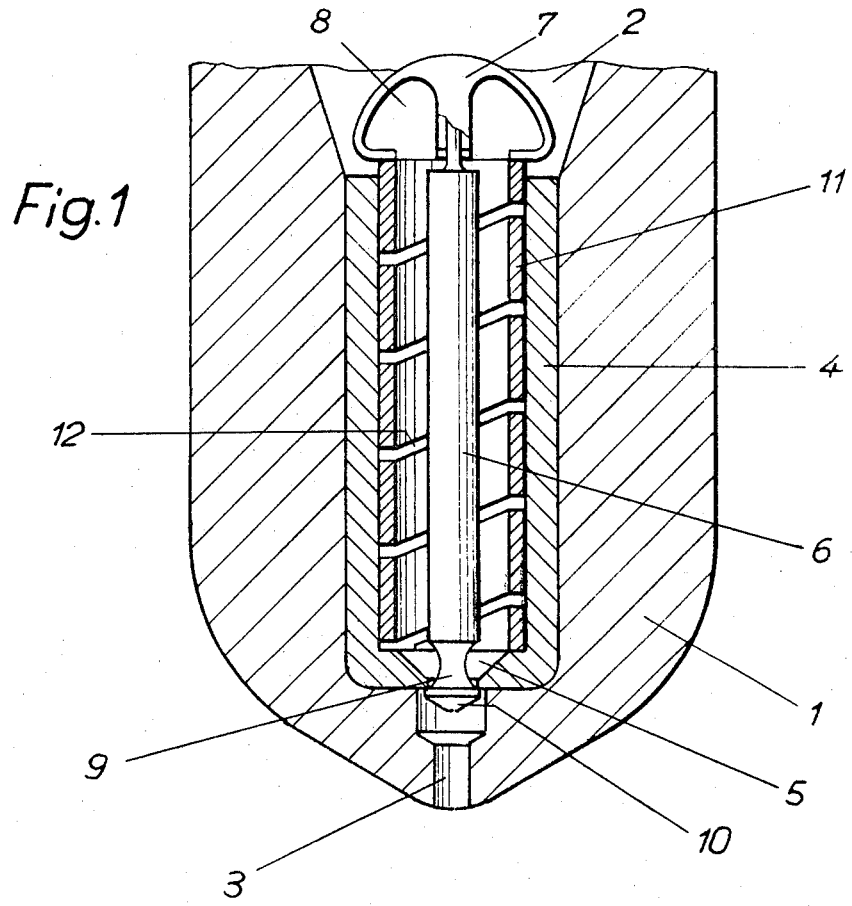
FIG. 1 shows a nozzle of the invention in fragmentary section through its axis.

Referring now to the drawing in detail, and initially to FIG. 1, there is seen the nozzle 1 of a screw-type injection molding machine, not otherwise illustrated, and conventional as far as not shown. The nozzle 1 is of generally cylindrical shape and one of its axial ends is threadedly fastened to the heating cylinder of the injection molding machine in a known manner, not shown. The other axial end tapers approximately conically.

The axial bore 2 of the nozzle 1 flares at one axial end toward the interior of the non-illustrated cylinder and axially terminates in a restricted orifice 3 in the tapering end portion of the nozzle 1. The central or main portion of the bore 2 is cylindrical and is lined by an approximately cup-shaped, conforming sleeve 4. The bottom wall of the cup shape has an aperture 5 which tapers conically toward an inner portion of the restricted orifice 3, slightly wider than the outermost portion of the orifice.

Figure 2:
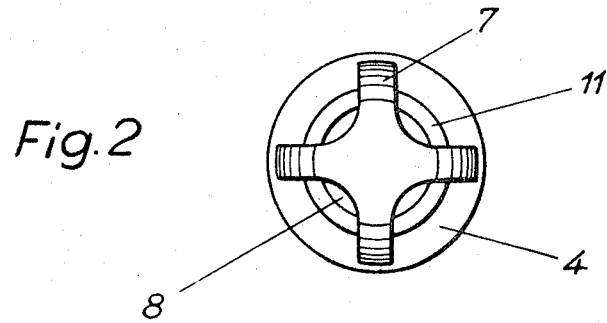
FIG. 2 is an axial end view of elements of the device of FIG. 1.

A generally cylindrical rod 6 is coaxially centered in the sleeve 4. Its end nearer the non-illustrated heating cylinder carries a distributor head 7 of hollow, hemispherical shape provided with four deep notches 8 which give access to the annular space between the rod 6 and the sleeve 4 and are best seen in FIG. 2. The reduced axial end 9 of the rod 6 near the orifice 3 passes through the aperture 5 and carries a valve disc 10 in the wider, inner portion of the orifice 3.

The valve disc 10 is normally held in sealing engagement with a valve seat constituted by the bottom wall of the sleeve 4 about the aperture 5 under the biasing pressure of a helical compression spring 11. The spring is a strip of spring-tempered metal formed by winding on a cylindrical mandrel in such a manner that the two wide faces of the strip are located in respective coaxial, cylindrical surfaces while the narrow edge faces of the wound strip bound the helical gap 12 which separates the turns of the spring.

One axial end of the spring abuts against the bottom wall of the sleeve 4, and the other end abuts against the distributor head 7. The spring is thus operatively interposed between the valve disc 10 and the body of the nozzle 1. It secures the rod 6 in its centered position.

During the injection stroke of the associated screw in the heating cylinder, not shown, the pressure of the hot, fluid plastic on the valve assembly, including the head 7, moves the disc 10 inward of the orifice 3 and away from its valve seat until the head 7 abuts against the sleeve 4, so that plastic can flow through the notches 8 in the distributor head 7, the annular space between the rod 6 and the spring 11 and out of the restricted orifice 3 into the non-illustrated mold. As soon as the pressure of the plastic subsides, and the force of the spring 11 prevails, the disc 10 returns to the illustrated position of sealing engagement with the valve seat on the sleeve 4.

A portion of the plastic material flows through the steeply helical gap 12, while the disc 10 is in its non-illustrated orifice-opening position, and cannot be trapped in the gap for more than one molding cycle, the gap being sealed in a radially outward direction by the inner cylindrical wall of the sleeve 4 which conformingly engages the outer face of the spring 11. The nozzle 1 is at a relatively high temperature during its normal operation, being heated by flowing molten plastic or by heating elements, not shown, and any plastic remaining in the nozzle bore for an appreciable period would be subject to thermal decomposition and cause defects in the molded goods when ultimately discharged. Such defects are safely avoided by the illustrated cross sectional shape of the spring 11 which is preferred, for this reason, over a corresponding spring of circular or square cross section, which would retard discharge of a portion of the thermoplastic material, and would offer greater resistance to the flow of the main stream of plastic from the non-illustrated cylinder to the orifice 3.

While the nozzle shown in FIGS. 1 and 2 has been used successfully on screw-type injection molding machines, it is not entirely satisfactory in machines of the plunger-type in which the pressure of the plastic melt in the nozzle does not decay fast enough to permit quick return of the valve disc 10 to the illustrated position of sealing engagement with the valve seat on the sleeve 4. The modified nozzle illustrated in FIG. 3 avoids the loss of a small amount of molten plastic through the orifice 3 resulting from the relatively slow closing of the valve disc 10 by the spring 11 against the slowly decaying fluid pressure.

Figure 3:
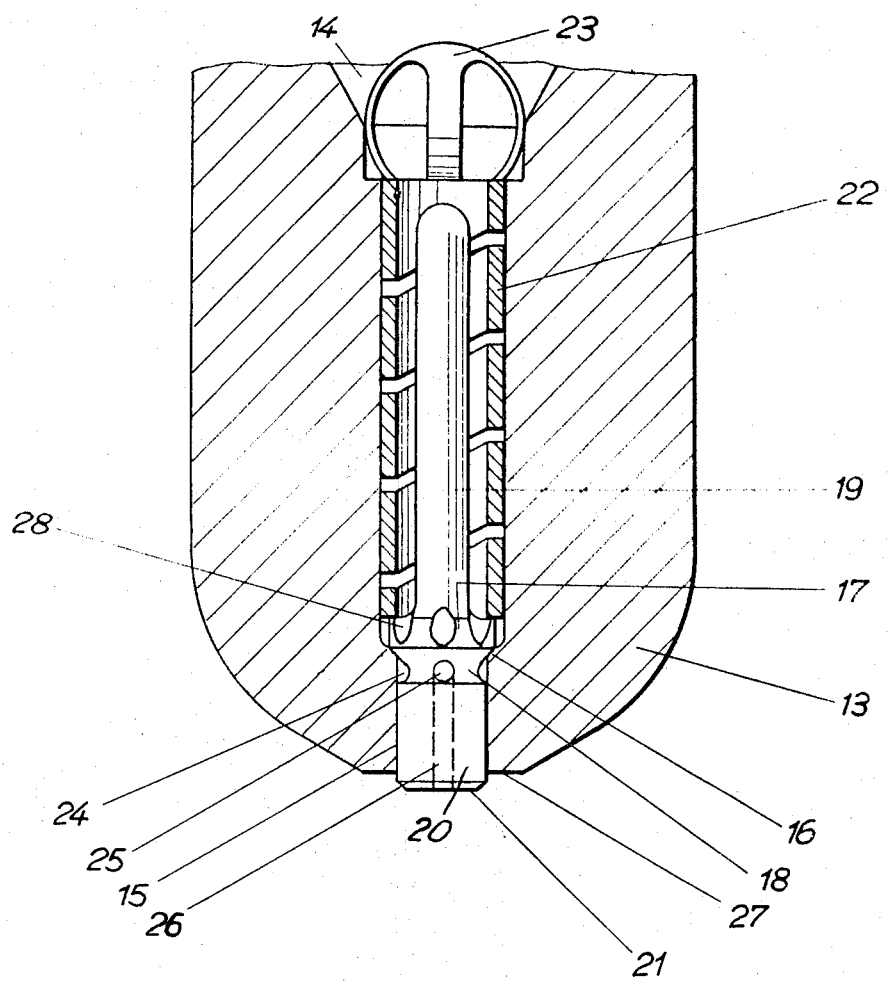
FIG. 3 shows a modified nozzle in a view corresponding to that of FIG. 1.

The nozzle 13 shown in FIG. 3 is closely similar to the nozzle 1 except for its bore 14 whose axially terminal discharge orifice 15 is only slightly restricted so as to form an annular shoulder 16 at its juncture with the main or central portion of the bore. The shoulder 16 provides a valve seat for a valve member 17, 18. A cylindrical guide rod 19 extends from the valve member inward of the nozzle toward the non-illustrated heating cylinder, and an abutment rod 20 extends from the valve member 18 through the orifice 15 in conforming engagement with the orifice walls. The rods 19 and 20 are integrally fastened to the valve member 17, 18, and the radial end face 21 of the abutment rod 20 is located outside the orifice 15 in the illustrated, orifice-closing position of the valve member 17, 18.

The valve member has two integral, axial portions 17, 18 respectively wider and narrower than the central opening in the shoulder 16. The narrow portion 18 is located in the orifice 15 in the illustrated valve position, and the wider portion 17 is held in abutting engagement with the shoulder 16 by a spring 22 substantially identical with the afore-described spring 11. The end of the spring 22 near the non-illustrated heating cylinder abuts against a distributor head 23 similar to the head 7 shown in FIGS. 1 and 2, but fixedly fastened in the flaring end of the bore 14 in a manner not explicitly shown.

The narrow portion 18 of the valve member has an annular, circumferential groove 24 permanently communicating with a diametrical bore 25 and an axial bore 26 leading outward from the bore 25 to an orifice centered in the end face 21 of the abutment rod 20.

When the valve assembly is pushed inward of the bore 14 until the end face 21 of the abutment rod 20 is flush with the corresponding end face 27 of the nozzle body 13, the groove 24 is partly located in the cylindrical portion of the bore 14 to form a by-pass around the shoulder 16 communicating with a chamber axially bounded by the wider portion 17 of the valve member and the spring 22. The chamber is connected with the annular space between the guide rod 19 and the spring 22 by notches 28 in the wider portion 17 of the valve member.

During normal operation of the injection molding machine equipped with the nozzle illustrated in FIG. 3, the spring 22 and the pressure of the molten resin composition cooperate to keep the valve member 17, 18 in the illustrated, orifice-closing position until the end face 21 of the abutment rod 20 engages the sprue bushing of the non-illustrated mold, and the orifice of the bore 26 is aligned with the opening in the sprue bushing. The entire valve assembly is displaced inward of the bore 14, and plastic can be discharged from the main portion of the bore 14 through the notches 28, the groove 24, the diametrical bore 25, and the axial bore 26 into the mold. As soon as the mold and the nozzle are moved apart, the valve closes instantaneously regardless of the pressure of the fluid plastic.

The guide rod 19 is held in its coaxial position in the bore 14 by the pressure of the fluid resin composition and prevents the valve member from being tilted in the orifice 15.

It should be understood, of course, that the foregoing disclosure relates only to preferred embodiments of the invention, and that it is intended to cover all changes and modifications of the examples of the invention chosen for the purpose of the disclosure which do not constitute departures from the spirit and scope of the appended claims.

What is claimed is:

1. An injection nozzle for an injection molding machine comprising, in combination:
   a. a nozzle body having an axis and an inner wall bounding an axial bore through said nozzle body,
      1. said bore having an axially terminal orifice portion of reduced cross section;
   b. means defining a valve seat on said nozzle body adjacent said orifice portion;
   c. a valve member axially movable in said bore toward and away from a position of orifice sealing engagement with said valve seat,
      1. said orifice portion providing the sole path of material flow outward of said bore when said valve member is spaced from said position thereof;
   d. a helical compression spring operatively interposed in said bore between said nozzle body and said valve member and biasing the valve member toward said position thereof,
      1. said spring essentially consisting of an elongated strip of metal of elongated rectangular cross section helically coiled in a plurality of turns axially separated by a helical gap,
      2. said strip having two wide longitudinal faces and two narrow longitudinal faces, said wide faces extending in respective surfaces of circular cross section about said axis, and said narrow faces bounding said gap,
      3. one of said wide faces conformingly engaging said inner wall.

2. A nozzle as set forth in claim 1, wherein said bore has another axially terminal portion flaring in a direction away from said orifice portion, and a substantially cylindrical portion intermediate said axially terminal portions, said intermediate portion receiving said spring.

3. A nozzle as set forth in claim 2, further comprising an apertured distributor head mounted in said flaring terminal portion, said spring abuttingly engaging said distributor head.

4. A nozzle as set forth in claim 1, further comprising a cup-shaped sleeve member received in said bore, said sleeve member having an apertured bottom wall transverse to said axis and constituting said valve seat, and an axial wall constituting said inner wall.

5. A nozzle as set forth in claim 5, wherein one axial end of said spring abuttingly engages said bottom wall.

6. A nozzle as set forth in claim 1, further comprising an abutment member fixedly fastened to said valve member and projecting outward of said orifice portion in said position of said valve member.

* * * * *